United States Patent
Park et al.

(10) Patent No.: US 9,189,348 B2
(45) Date of Patent: Nov. 17, 2015

(54) HIGH AVAILABILITY DATABASE MANAGEMENT SYSTEM AND DATABASE MANAGEMENT METHOD USING SAME

(75) Inventors: Ki Eun Park, Seongnam-si (KR); Sung Kyu Kim, Seongnam-si (KR); Hye Jung Yi, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 285 days.

(21) Appl. No.: 13/381,853

(22) PCT Filed: Jun. 21, 2010

(86) PCT No.: PCT/KR2010/003995
§ 371 (c)(1),
(2), (4) Date: Dec. 30, 2011

(87) PCT Pub. No.: WO2011/002169
PCT Pub. Date: Jan. 6, 2011

(65) Prior Publication Data
US 2012/0109919 A1  May 3, 2012

(30) Foreign Application Priority Data
Jul. 2, 2009  (KR) .................. 10-2009-0060314

(51) Int. Cl.
*G06F 17/30* (2006.01)
*G06F 11/20* (2006.01)
(Continued)

(52) U.S. Cl.
CPC ........ *G06F 11/2023* (2013.01); *G06F 11/2097* (2013.01); *H04L 67/14* (2013.01); *H04L 69/40* (2013.01)

(58) Field of Classification Search
CPC .......................... G06F 11/2023; G06F 11/2097
USPC ................................... 707/703, 687
See application file for complete search history.

(56) References Cited

U.S. PATENT DOCUMENTS

| 2004/0205048 A1 | 10/2004 | Pizzo et al. |
| 2008/0222159 A1* | 9/2008 | Aranha et al. .......... 707/10 |
| 2009/0150718 A1* | 6/2009 | Park et al. ............ 714/4 |

FOREIGN PATENT DOCUMENTS

| JP | 03-131937 | 6/1991 |
| JP | 2000-057030 A | 2/2000 |

(Continued)

OTHER PUBLICATIONS

Japanese Office Action for Application No. 2012-518485 dated Nov. 19, 2013.

(Continued)

*Primary Examiner* — Sheree Brown
(74) *Attorney, Agent, or Firm* — Harness, Dickey & Pierce, PLC (57) ABSTRACT

Provided is a method of managing a database (DB) using a high availability database management system (DBMS), which continuously provides a service when an error occurs in the DBMS. The DB management method in the high availability DBMS including a plurality of broker nodes and a plurality of server nodes may include an operation (a) to enable one of the plurality of broker nodes to access a main server node of the plurality of server nodes when a DB change request is received from an application server, and an operation (b) to enable the main server node to process the DB change request when the broker node succeeds in accessing the main server node, and to enable the broker node to access one of sub-server nodes so that the sub-server node processes the DB change request when the broker node fails to access the main server node due to an error in the main server node.

19 Claims, 8 Drawing Sheets

(51) Int. Cl.
*H04L 29/08* (2006.01)
*H04L 29/14* (2006.01)

(56) References Cited

FOREIGN PATENT DOCUMENTS

| JP | 2002-108640 A | 4/2002 |
|----|---------------|--------|
| JP | 2003-296211 A | 10/2003 |
| JP | 2004-295605   | 10/2004 |
| JP | 2005-018463 A | 1/2005 |
| JP | 2005-234755 A | 9/2005 |
| JP | 2007-264770 A | 10/2007 |
| JP | 2008-059529 A | 3/2008 |
| JP | 2008-092144   | 4/2008 |
| KR | 1020000012756 | 3/2000 |
| KR | 1020030051930 | 6/2003 |
| KR | 1020070074867 | 7/2007 |
| KR | 1020090061522 | 6/2009 |

OTHER PUBLICATIONS

Japanese Office Action dated Feb. 3, 2015 in corresponding Japanese Application No. 2014-084462.
International Search Report for PCT/KR2010/003995 dated Feb. 23, 2011.

* cited by examiner

HIGH AVAILABILITY DATABASE MANAGEMENT SYSTEM AND DATABASE MANAGEMENT METHOD USING SAME

CROSS REFERENCE RELATED APPLICATIONS

This application is the National Stage Entry of International Application PCT/KR2010/003995, filed on Jun. 21, 2010, and claims priority from and the benefit of Korean Patent Application No. 10-2009-0060314, filed on Jul. 2, 2009, all of which are incorporated herein by reference for all purposes as if fully set forth herein.

BACKGROUND OF THE INVENTION

1. Field of the Invention

Exemplary embodiments of the present invention relate to a database management system (DBMS), and more particularly, to a high availability DBMS.

2. Discussion of the Background

A database management system (DBMS) refers to a system that manages a database (DB) storing a huge amount of data. The DBMS is regarded as an item of importance in the modern world where a great amount of information is being produced on a continuous basis, and the DBMS has been diversely utilized, in varied fields, to provide an online service.

A DBMS operator may make a mistake, or an error may occur in system hardware while the DBMS is being operated. In this instance, the error may cause a tremendous amount of damage. In particular, for a portal service that provides services for 24 hours, an error in the DBMS may be a fatal error.

Therefore, the most important point of focus for the operation of the DBMS is taking precaution against an error occurring in the DBMS, that is, to provide a continuous service that uses the DBMS although an error occurs in the DBMS, and to prevent loss of data while the DBMS is restored.

A scheme of backing up an operational DB in an additional storage device, periodically, has been proposed as a precaution being taken against errors in the DBMS. In this example, the operational DB may be restored based on the backed up DB and may restart providing service even though an error occurs in the DBMS. However, although the operational DB is restored based on the backed up DB, there may be loss of data. The DB is backed up based on predetermined time intervals and thus, data generated after the backup may be lost. Also, when the backup interval is shortened to decrease data loss, a load is added to a system.

In addition, a scheme of generating a standby DBMS through asynchronous replication of an original DB has been suggested. The asynchronous replication replicates contents of the original DB continuously such that a service may be provided based on the standby DBMS when an error occurs in the original DB. However, the replicated DB based on the asynchronous replication and the original DB may not exactly the same and thus, data loss may occur when an error occurs in the original DBMS.

For example, it is assumed that there is a process of storing, in the original DB, data of which a range of a primary key is from "1" to "100", sequentially, and an error occurs at a point in time when primary keys "1" to "99" are stored. In this example, the service may be provided based on the replicated DB. However, for data having a primary key "100" which is included in the original DB and is absent in the replicated DB, new data having a primary key "100" may be added. The added data is different from the data having the primary key "100" in the original DB and thus, different data having the identical primary key may exist in the original DB and the replicated DB, respectively. Accordingly, data loss occurs.

In addition to the above described weaknesses, the DB backup and replication method provided in the foregoing may have a drawback in that manually determining whether to use an operational DB restored based on backup data or a replicated DB, when an error occurs in the DBMS and thus, a service may be substantially stopped.

Also, in the DB backup and replication method, an application program that accesses the DBMS may need to change an access mechanism for a DB.

SUMMARY OF THE INVENTION

Exemplary embodiments of the present invention provide a database (DB) management method using a high availability database management system (DBMS) that may continuously provide a service when an error occurs in the DBMS.

Exemplary embodiments of the present invention also provide a DB management method using a high availability DBMS that may provide a service continuously, without data loss when an error occurs in the DBMS.

Exemplary embodiments of the present invention also provide a DB management method using a high availability DBMS where a fail-over and a fail-back are automatically performed between a main server node and a sub-server node.

Exemplary embodiments of the present invention also provide a DB management method using a high availability DBMS that may provide a service continuously without correcting or changing an application program even when an error occurs in the DBMS.

Exemplary embodiments of the present invention also provide a DB management method using a high availability DBMS based on a disk.

Additional features of the invention will be set forth in the description which follows, and in part will be apparent from the description, or may be learned by practice of the invention.

An exemplary embodiment of the present invention discloses a database (DB) managing method in a high availability DB management system including a plurality of broker nodes and a plurality of server nodes, the method including performing an operation (a) to enable one of the plurality of broker nodes to access a main server node among the plurality of server nodes when a DB change request is received from an application server, and performing an operation (b) to enable the main server node to process the DB change request when the broker node succeeds in accessing the main server node, and to enable a sub-server node to process the DB change request through enabling the broker node to access one of sub-server nodes when the broker node fails to access the main server node due to an error in the main server node.

When the broker node fails to access the main server node, the operation (b) may enable the broker node to access the sub-server nodes, sequentially, based on a predetermined order.

When an error is detected in the main server node, the operation (b) may change a mode of a sub-server node to which the broker node is to perform an access from a standby mode to an active mode, so as to enable the broker to access the sub-sever node.

When the broker node accesses the sub-server node in the operation (b), the method may further include an operation (c) to block the access by the broker node to the sub-server node by changing a mode of the sub-sever node from an active mode to a standby mode when error recovery of the main server node is detected, so that the broker node accesses the main server node.

When the broker node accesses the sub-server node in the operation (b), the method may further include an operation (c) to set a mode of the main server node to a standby mode so as to reflect, to a DB of the main server node, a transaction log occurring when the sub-server node processes the DB change request, and to change the mode of the main server node from the standby mode to an active mode so as to enable the broker to access the main server node when the main server node recovers from the error.

When the main server node processes the DB change request in the operation (b), the operation (b) may include an operation (b1) to enable the main server node to make a change in a DB of the main server node in response to the DB change request and to generate a transaction log associated with the change in the DB, and an operation (b2) to transmit the transaction log to sub-server nodes for replication of the DB of the main server node.

When the transaction log of the main server node is transmitted from the main server node, the sub-server nodes reflect the transaction log of the main server node in DBs of the sub-server nodes so as to synchronize the DB of the main server node with the DBs of the sub-server nodes.

When the sub-server node processes the DB change request in the operation (b), the operation (b) may include an operation (b1) to enable the sub-server node to make a change in a DB of the sub-server node in response to the DB change request and to generate a transaction log associated with the change in the DB, and an operation (b2) to transmit the transaction log to the main server node or remaining sub-server nodes for replication of the DB of the sub-server node.

When the transaction log of the sub-server node is transmitted from the sub-server node, the main server node or remaining server nodes may reflect the transaction log of the sub-server node in the DB of the main server node or DBs of the remaining sub-server nodes so as to synchronize the DB of the sub-server node with the DB of the main server node or DBs of the remaining sub-server nodes.

The plurality of server nodes may be operated based on a disk.

The operation (a) may further include determining whether an error occurs in the broker node, and, when the determining determines that the error occurs in the broker in the operation (a), a subsequent broker node among the plurality of broker nodes based on a predetermined order may receive the DB change request and accesses the main server node.

Another exemplary embodiment of the present invention discloses a DBMS, the system including a broker node to receive a DB change request from an application server, to transmit the DB change request to a main server node when the broker node succeeds in accessing the main server node, and to attempt to access at least one sub-server node, sequentially, based on a predetermined order when the broker node fails to access the main server node due to an error in the main server node so as to transmit the DB change request to a sub-server node that is accessed by the broker node, the main server node to receive and to process the DB change request transmitted from the broker node when the main server node is accessed by the broker node, and the at least one sub-server node to receive and to process the DB change request transmitted from the broker node when the at least one sub-server node is accessed by the broker node due to an error in the main server node.

It is to be understood that both the foregoing general description and the following detailed description are exemplary and explanatory and are intended to provide further explanation of the invention as claimed.

According to exemplary embodiments of the present invention, a service may be provided continuously even when an error occurs in a database management system (DBMS) and thus, reliability in providing a service may be improved.

According to exemplary embodiments of the present invention, a database (DB) may be replicated based on a synchronization scheme and thus, data loss may be prevented when an error occurs in a DBMS.

According to exemplary embodiments of the present invention, fail-over and fail-back is automatically performed between a main server node and a sub-server node and thus, a time expended for fail-over and fail-back between an activated server and a standby server may be shortened.

According to exemplary embodiments of the present invention, an access to an available DB is automatically determined by a broker that takes charge of an access to a DBMS and thus, a service may be provided without correcting or changing an application program.

According to exemplary embodiments of the present invention, a great amount of data may be readily processed based on a disk.

DETAILED DESCRIPTION OF THE ILLUSTRATED EMBODIMENTS

The exemplary embodiments are described below in order to explain the present invention by referring to the figures.

Figure 1:
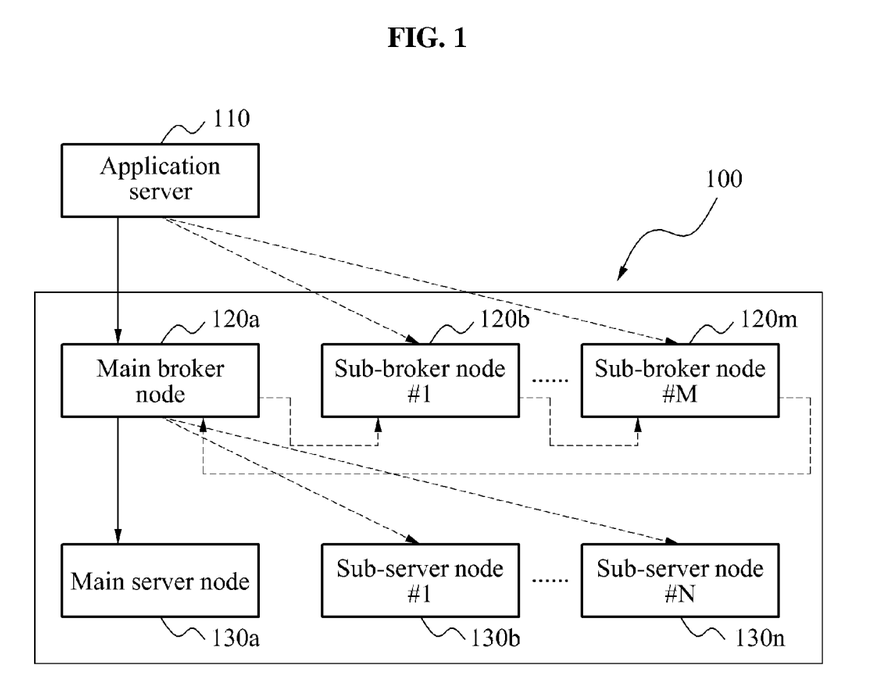
FIG. 1 is a diagram illustrating a configuration of a network to which a high availability data base management system (DBMS) is applied according to an exemplary embodiment of the present invention.

FIG. 1 illustrates a configuration of a network to which a high availability data base management system (DBMS) 100 is applied according to an embodiment of the present invention. Referring to FIG. 1, the high availability DBMS 100 may process a database (DB) change request, transmitted from an application server 110, and the DBMS 100 may include a plurality of broker nodes 120a to 120m, which includes a main broker node 120 a and a plurality of sub-broker nodes 120b to 120m, and a plurality of server nodes 130a to 130n, which includes a main server node 130a and a plurality of sub-server nodes 130b to 130n.

The plurality of broker nodes 120a to 120m may include the main broker node 120a and the plurality of sub-broker nodes 120b to 120m. The plurality of broker nodes 120a to 120m is included in the present embodiment to provide a service, continuously, through the plurality of sub-broker nodes 120b to 120m even when an error occurs in the main node 120a.

In particular, the main broker node 120a may receive the DB change request from the application server 110, may attempt an access to the main server node 130a, and may transmit the DB change request to the main server node 130a when the main broker node 120a succeeds in accessing the main server node 130a.

When an error occurs in the main server node 130a and the main broker node 120a fails to access the main server node 130a, the main broker node 120a may attempt an access to the plurality of sub-serve nodes 130b to 130n sequentially, based on a predetermined order on a server access list included in the main broker node 120a, and may transmit the DB change request to a sub-server node accessed by the main broker node 120a.

Accordingly, although an error occurs in the main server node 130a, the main broker node 120a automatically transmits the DB change request to a sub-server node, for example, the sub-server nodes 130b-130n and thus, the DB change request may be processed by the sub-server node. Therefore, a service may be provided continuously without correcting or changing the application server 110.

When an error occurs in the main broker node 120a, a sub-broker node among the sub-broker nodes 120b to 120m, which is determined based on a predetermined order, may receive the DB change request from the application server 110, and may transmit the received DB change request to one of the main server node 130a and the sub-server nodes 130b to 130n.

In particular, when an error occurs in the main broker node 120a, the first sub-broker node 120b may process an server node relay operation that is being processed by the main broker node 120a, and when an error occurs in the first broker node 120b due to consecutive errors, the second sub-broker node 120c may take over and process the server node relay operation.

Therefore, exemplary embodiments of the present invention provide an active-active structure where all broker nodes may function as a main broker node and a backup of another broker node and thus, the structure may cope with errors that may simultaneously occur in the broker nodes.

Subsequently, the plurality of server nodes 130a to 130n may include the main server node 130a and the plurality of sub-server nodes 130b to 130n. In this example, all the server nodes may be included in the same internet data center (IDC). In some embodiments, a few sub-server nodes may be included in different IDCs from the IDC of the main server node 130a.

The plurality of sub-server nodes 130b to 130n are included in the present embodiment to continuously provide a service through the plurality of sub-server nodes 130b to 130n even when an error occurs in the main server node 130a.

As illustrated in FIG. 1, the main server node 130a may perform a function that receives the DB change request transmitted from the broker node 120a to process the received DB change request when the broker node 120a accesses the main server node 130a, and the sub-server node, for example, the sub-server nodes 130b to 130n, may perform a function that receives the DB change request transmitted from the broker node 120a to process the received DB change request when the broker node 120a does not access the main server node 130a due to an error in the main server node 130a.

In this example, the server node to be accessed by a broker node, for example, the broker nodes 120a to 120m, among the plurality of sub-server nodes 130b to 130n may be determined based on an order in a server access list included in the broker node.

Hereinafter, a configuration of the server node will be described in detail with reference to FIG. 2.

Figure 2:
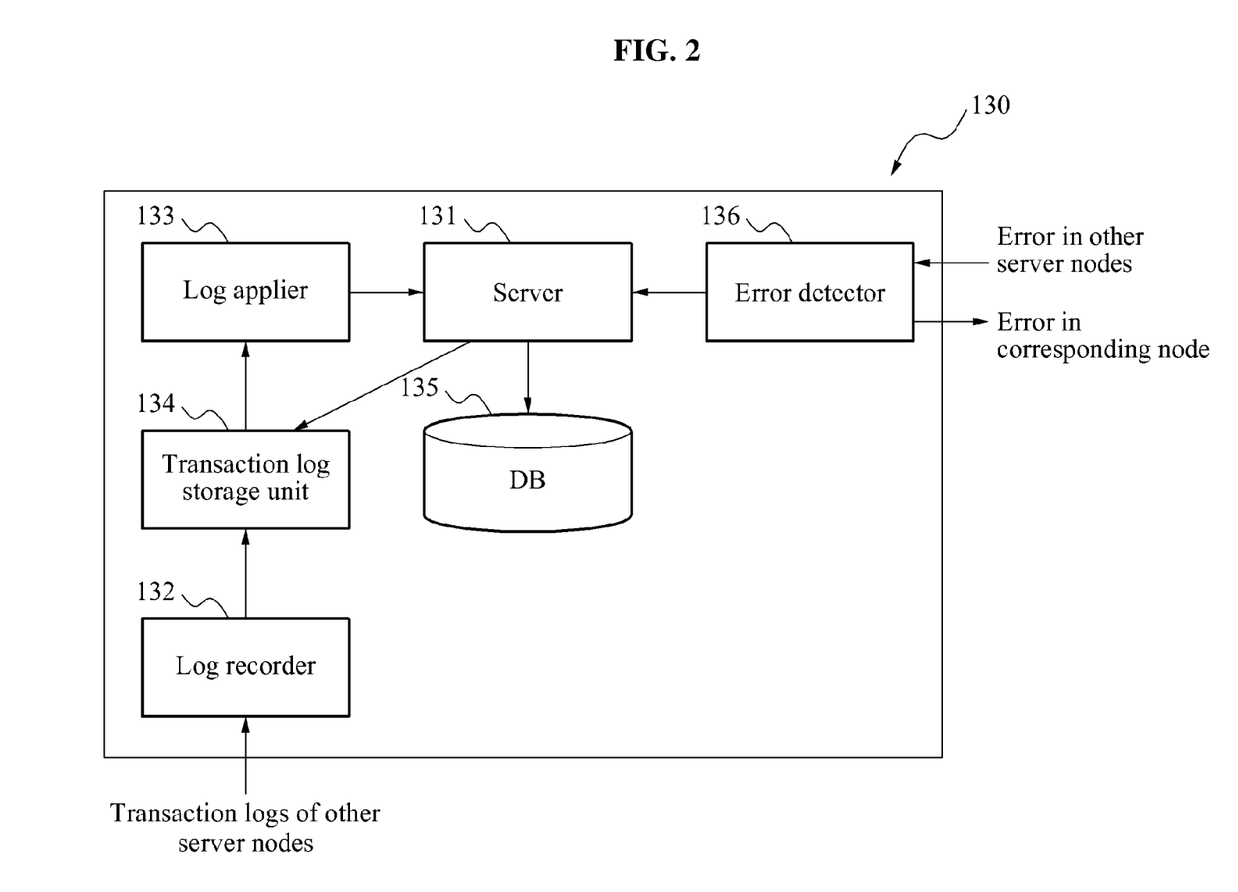
FIG. 2 is a diagram illustrating a configuration of a server node according to an exemplary embodiment of the present invention.

FIG. 2 illustrates a configuration of a server node 130 according to an embodiment of the present invention. The server node 130 may include a server 131, a log recorder 132, a log applier 133, a transaction log storage unit 134, a DB 135, and an error detector 136. For ease of description, the server node 130 is assumed to be a main server node.

The server 131 may receive a DB change request from a broker node, for example, the broker nodes 120a to 120m, and may make a change in the DB 135 in response to the received DB change request when the broker node accesses the main server node 130a.

When the change is made in the DB 135 in response to the DB change request, the server 131 may generate a transaction log associated with the change in the DB 135, may store the generated transaction log in the storage unit 134, may replicate the generated transaction data log, and may transmit the replicated transaction data log to at least one of the sub-server nodes 130b to 130n.

Here, since the server 131 replicates the transaction log and transmits the replicated transaction log to the at least one of the sub-server nodes 130b to 130m, the at least one sub-server node may replicate the DB of the main server node 130a by reflecting the transaction log of the main server node 130a to a DB of the at least one sub-server node, and may provide a service, continuously, through the at least one sub-server node when an error occurs in the main server node 130a.

The log recorder 132 may receive transaction logs from the sub-server nodes 130b to 130n and may store the received transaction logs in the transaction log storage unit 134, so as to reflect, to the DB of the main server node 130a, changes in DBs of the sub-server nodes 130b to 130n.

Since the log recorder 132 receives the transaction logs from the sub-server nodes 130b to 130n and stores the transaction logs in the transaction log storage unit 134, the main server node 130a may reflect, in the DB of the main server node 130a, the changes processed by the sub-server nodes 130b to 130n while an error occurs in the main server node 130a.

The log applier 133 may analyze the transaction logs of the server nodes 130b to 130n received by the log recorder 132 so as to reflect the analyzed transaction logs in the DB 135 through the server 131 and thus, DBs of the server nodes may be synchronized.

The error detector 136 may periodically monitor whether an error or error recovery occurs in the main server node or a sub-server node, and may transmit a monitoring result to the server 131 so that the server 131 changes a mode of the main server node.

According to an exemplary embodiment, when an error occurs in the main server node 130a, the error detector 136 may transmit, to the sub-server nodes 130b to 130n, information indicating that an error occurs so as to change a mode of one of the sub-server nodes 130b to 130n and thus, a server node that provides a service may be failed over to a sub-server node.

When error recovery of the main server node 130a is detected, the error detector 136 may communicate with the server 131 and the sub-server node that takes charge of a service. Therefore, a mode of the main server node 130a may be changed to a standby mode and then to an active mode, and a mode of the sub-server node that takes charge of the service may be changed to a to-be-standby mode and then to a standby mode.

In particular, when the server 131 of the main server node 130a is notified of the error recovery, the server 131 may set the mode of the main server node 130a to a standby mode, and, when a transaction log associated with a change in a DB (not illustrated) of a sub-server node, for example, the sub-server nodes 130b to 130n, occurring during an occurrence of an error in the main server node 130a, is reflected to the DB 135, the server 131 may change the mode of the main server node 130a from the standby mode to an active mode and thus, a server node that provides a service may automatically failed back to the main server node from the sub-server node.

In a case where the error detector 136 is included in a sub-server node, for example, the sub-server nodes 130b to 130n, the error detector 136 may change the mode of the sub-server node from a standby mode to an active mode when an error of the main server node 130a is detected, and may change the mode of the sub-server node from the active mode to the standby mode when error recovery of the main server node 130a is detected.

The error detector 136 may be embodied by a heartbeat process.

The plurality of server nodes 130a to 130n may be operated based on a disk, so as to process a great amount of data.

Hereinafter, a process of changing a mode of a server node will be described. For ease of description, a reference numeral for a sub-server node is "130b".

Before describing the process of changing the mode of the server node, each mode of the server node will be described. The mode of the server node may be classified into an idle mode, an active mode, a standby mode, a to-be-active mode, a to-be-standby mode, and a dead mode.

The idle mode may indicate that a server node, which is absent in a server node, is not executed substantially.

The active mode may indicate a mode that is capable of processing a DB change request, particularly, a DB update request.

The standby mode may indicate a mode that waits and replicates a transaction log of a server node being in an active mode. The main server node 130a may be set to be in a standby mode when the main server node 130a recovers from an error, and the sub-server node 130b may be initially set to be in a standby mode. When the server node is in a standby mode, the server node may process a DB select request but may not process a DB update request.

The to-be-active mode may indicate a mode that a server node in a standby mode goes through before being changed to an active mode. The main server node 130a may go through a to-be-active mode when the mode of the main server node 130a is changed from a standby mode to an active mode after error recovery, and the sub-server node 130b may go through a to-be active mode when the mode of the sub-server node 130b is changed from a standby mode to an active mode since an error occurs in the main server node 130a. When a server node is in a to-be-active mode, an access by a broker node, for example, the broker nodes 120a to 120m, may be allowed. However, all DB change requests may be suspended until the corresponding server node is in an active mode.

The to-be-standby mode may indicate a mode that the server node in an active mode goes through before being changed to a standby mode. The main server node 130a may go through a to-be-standby mode when a mode of the sub-server node 130b is changed from an active mode to a standby mode again since the main server node 130a recovers from an error. When a server node is in a to-be-standby mode, transactions executed in the corresponding server node are continuously executed, but an access by a new broker node, for example, the broker nodes 120a to 120m, may be blocked.

The dead mode may indicate that an error occurs in a corresponding server node, which is substantially absent in the server node, similar to the idle mode. When the corresponding server node is in a dead mode, the server node may be changed merely to a standby mode.

Figure 3:
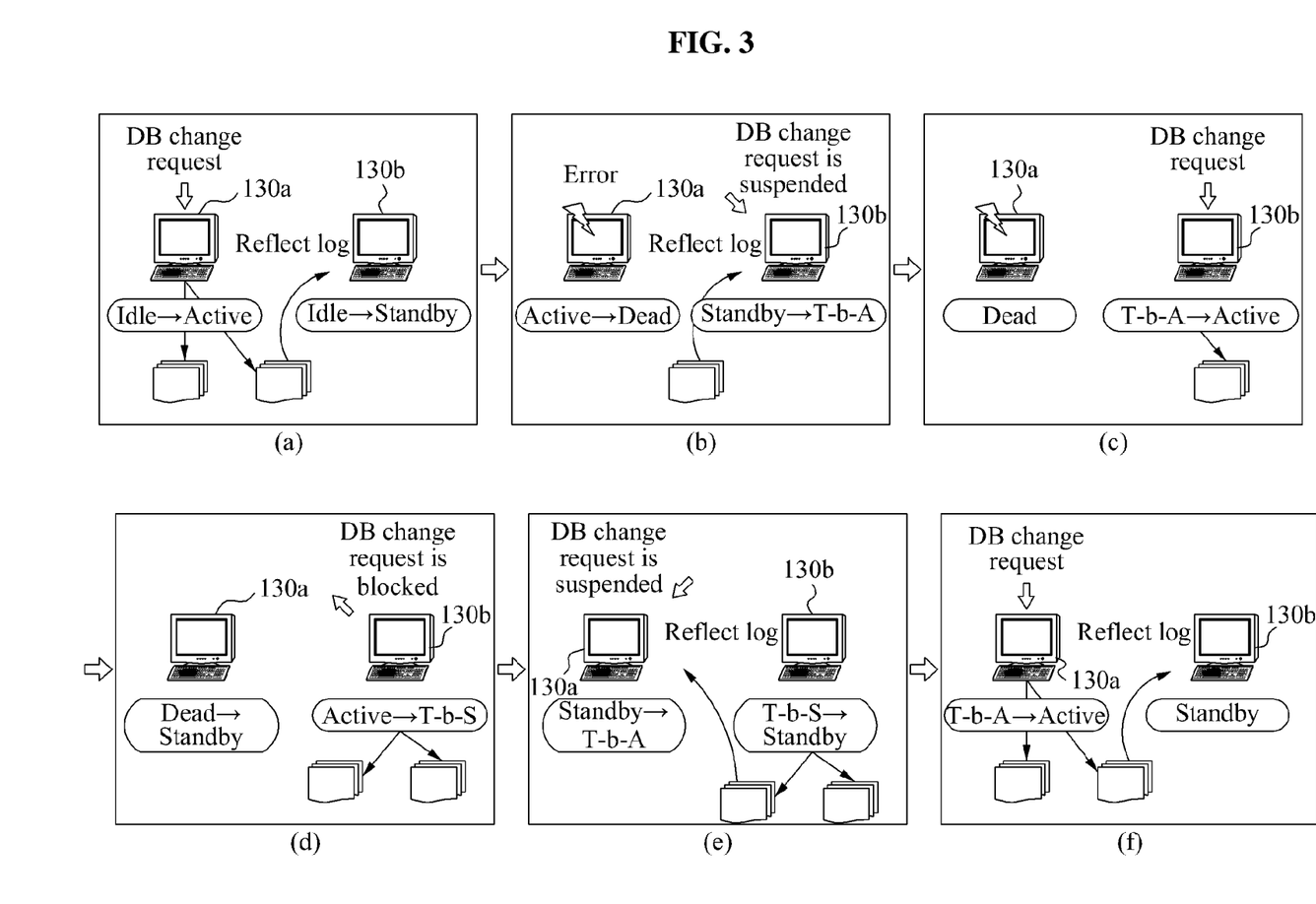
FIG. 3 is a diagram illustrating a process of mode transition of a server node according to an exemplary embodiment of the present invention.

The mode transition process of the server node will be described with reference to FIG. 3. As illustrated in FIG. 3a, when a DB change request is received, the main server node 130a may change a mode from an idle mode to an active mode, the sub-server node 130b may change a mode from an idle mode to a standby mode. In this instance, the main server node 130a may process the DB change request and may transmit, to the sub-server node 130b, a transaction log occurring while the DB change request is being processed so that the sub-server node 130b may replicate a DB of the main server node 130a.

As illustrated in FIG. 3b, when an error occurs in the main server node 130a, the main server node 130a may change the mode from the active mode to a dead mode, and the sub-server node 130b may change the mode from the standby mode to a to-be-active mode. In this example, accesses to the main server node 130a by a broker node, for example, the broker nodes 120a to 120m, may be blocked and thus, the broker node may access the sub-server node 130b automatically and may transmit a DB change request to the sub-server node 130b. However, the DB change request is suspended since the sub-server node 130b is in a to-be-active mode.

As illustrated in FIG. 3c, when the sub-server node 130b determines that all transaction logs of the main server node 130a are reflected in a DB, the sub-server node 130b may change the mode from the to-be-active mode to an active mode, and may process all suspended DB change requests.

As illustrated in FIG. 3d, when the main server node 130a recovers from the error, the main server node 130a may change the mode from the dead mode to a standby mode, and the sub-sever node 130b may change the mode from the active mode to a to-be-standby mode. In this example, although transmission of a DB change request to the sub-sever node 130b may be blocked, a transaction being executed in the sub-sever node 130b may be continuously executed.

As illustrated in FIG. 3e, the main server node 130a may reflect, in a DB of the main server node 130a, a transaction log of the sub-server node 130b, and may change the mode from the standby mode to a to-be-active mode. The sub-sever node 130b may change the mode from the to-be-standby mode to a standby mode. In this example, although a broker node, for example, the broker nodes 120a to 120m, transfers a DB change request to the main server node 130a, the DB change request may be suspended since the main server node 130a is in the to-be-active mode.

As illustrated in FIG. 3f, when all transaction logs of the sub-sever node 130b are reflected to the main server node 130a, the main server node 130a may change the mode from the to-be-active mode to an active mode so as to process a suspended DB change request, and the sub-sever node 130b may change the mode from the to-be-standby mode to a standby mode.

Figure 4:
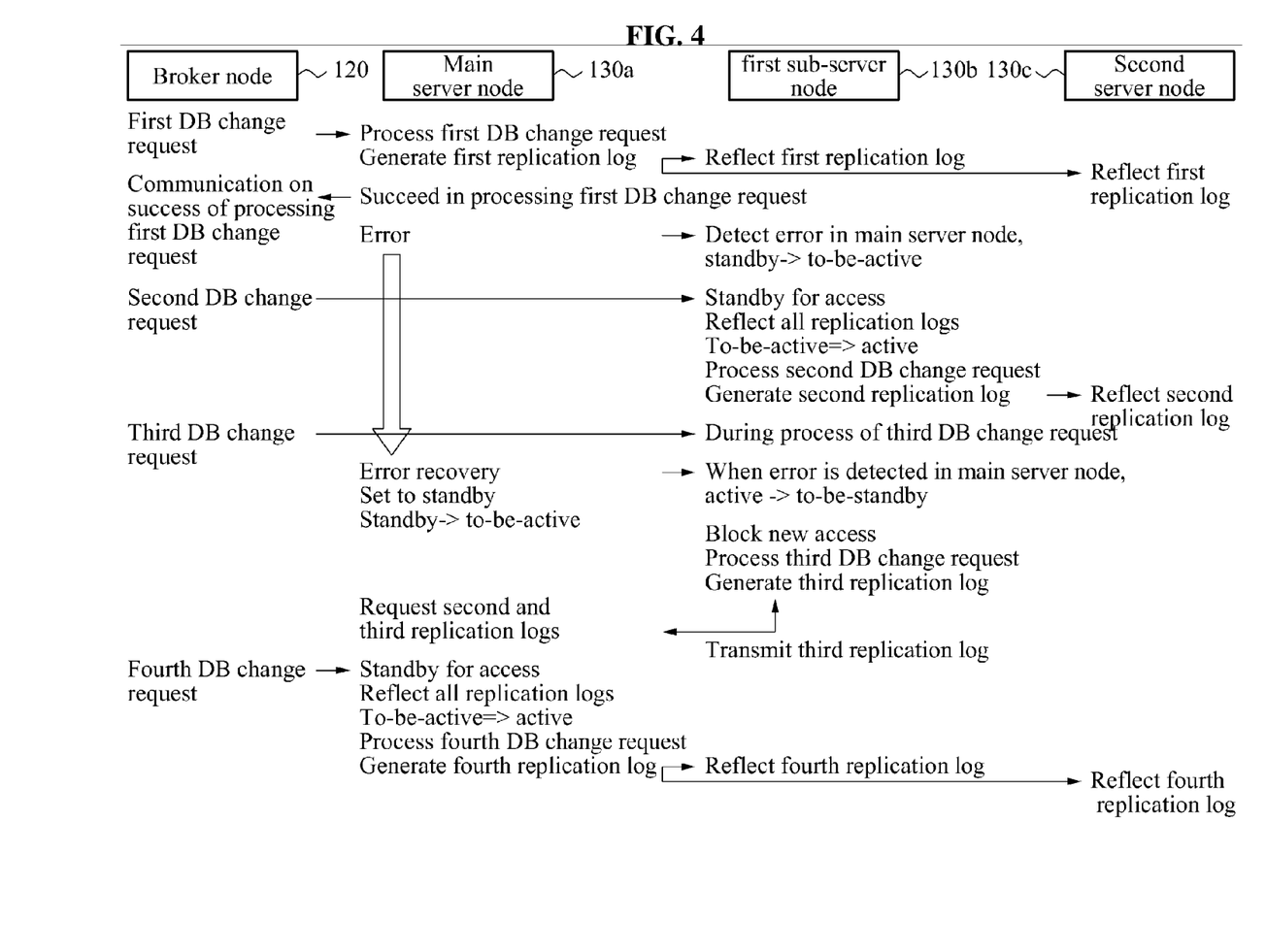
FIG. 4 is a diagram illustrating a process of fail-over and fail-back of a server node according to an exemplary embodiment of the present invention.

A process of fail-over and fail-back of a sever node when an error occurs in a main server node will be described with reference to FIG. 4. For ease of descriptions, a reference numeral for a broker node is "120".

When the broker node 120 transmits a first DB change request to the main server node 130a, the main server node 130a may process the first DB change request, may generate a first replication log, may transmit the first replication log to the first server node 130b and the second sub-server node 130c, and may communicate with the broker node 120 of success of the process of the first DB change request.

When an error occurs in the main server node 130a, the first sub-server node 130b may detect the error in the main server node 130a, may change a mode of the first sub-server node 130b from a standby mode to a to-be-active mode, and may reflect all transaction logs of the main server node 130a in a DB.

The broker node 120 may not access the main server node 130a and thus, may transmit a second DB change request to the first sub-server node 130b. However the first sub-server node 130b is in the to-be-active state and thus, the second DB change request may be suspended.

Subsequently, when the all transaction logs of the main server node 130a are reflected in the first sub-server node 130b, the first sub-sever node 130b may change the mode from the to-be-active mode to an active mode. In this instance, the first sub-sever node 130b may process the suspended second DB change request, may generate a second replication log, may transmit the generated second replication log to the second sub-server node 130c, and may communicate with the broker node 120 of success of the process of the second DB change request.

Subsequently, when the first sub-server node 130b receives a third DB change request from the broker node 120, and error recovery of the main server node 130a is detected while processing the third DB change request, the first sub-server node 130b may change the mode from the active mode to a to-be-standby mode. In this example, although the first sub-server node 130b processes the third DB change request continuously and generates a third replication log, the first sub-server node 130b may block an access by the broker node.

The main server node 130a may set the mode to a standby mode, may change the standby mode to a to-be-active mode, and may access the first sub-sever node 130b so as to request the second replication log and the third replication log generated during the error time, and the first sub-sever node 130b may transmit the second replication log and the third replication log to the main server node 130a, and may communicate with the broker node 120 of success of the process of the third DB change request.

Subsequently, an access to the first sub-sever node 130b by the broker node 120 may be blocked and thus, the broker node 120 may transmit a fourth DB change request to the main server node 130a. However, the first sub-sever node 130b is in the to-be-active mode, and thus, the fourth DB change request may be suspended.

After the main server node 130a reflect the second replication log and the third replication log in the DB, the main server node 130a may change the mode to the active mode, may process the suspended fourth DB change request so as to generate a fourth replication log, and may transmit the generated fourth replication log to the first server node 130b and the second sub-sever node 130c.

Figure 5:
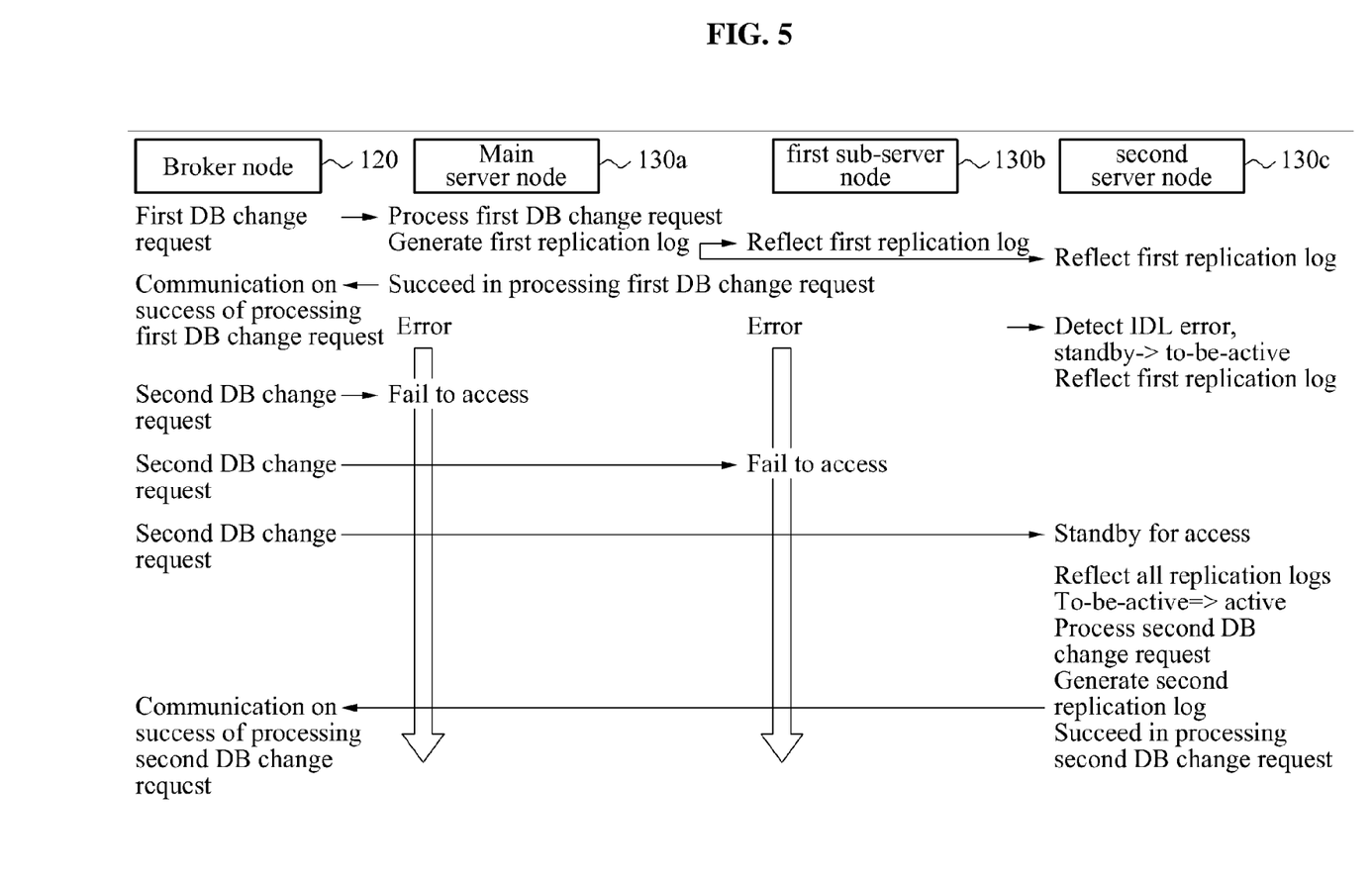
FIG. 5 is a diagram illustrating a process of fail-over of a server node when an internet data center (IDC) error occurs according to an exemplary embodiment of the present invention.

Hereinafter, a process of fail-over of a server node when an IDC error occurs will be described with reference to FIG. 5.

When the broker node 120 transmits a first DB change request to the main server node 130a, the main server node 130a may process the first DB change request, may generate a first replication log, may transmit the generated first replication log to the first sub-sever node 130b and the second sub-server node 130c, and may communicate with the broker node 120 of success of the process of the first DB change request.

When errors occur in both the main server node 130a and the first sub-sever node 130b included in the same IDC due to an IDC error, the second sub-server node 130c may detect the IDC error, may change a mode of the second sub-server node 130c from a standby mode to a to-be-active mode, and may reflect all transaction logs of the main server node 130a in a DB.

The broker node 120 may not be allowed to access both the main server node 130a and the first sub-server node 130b and thus, may transmit a second DB change request to the second sub-server node 130c. However, the second sub-server node 130c is in the to-be-active mode, and thus, the second DB change request may be suspended.

Subsequently, when all transaction logs of the main server node 130a are reflected in the second sub-server node 130c, the second sub-server node 130c may change the mode from the to-be-active mode to an active mode. In this example, the second sub-server node 130c may process the suspended second DB change request, may generate a second replication log, and may communicate with the broker node 120 of success of the process of the second DB change request.

Figure 6:
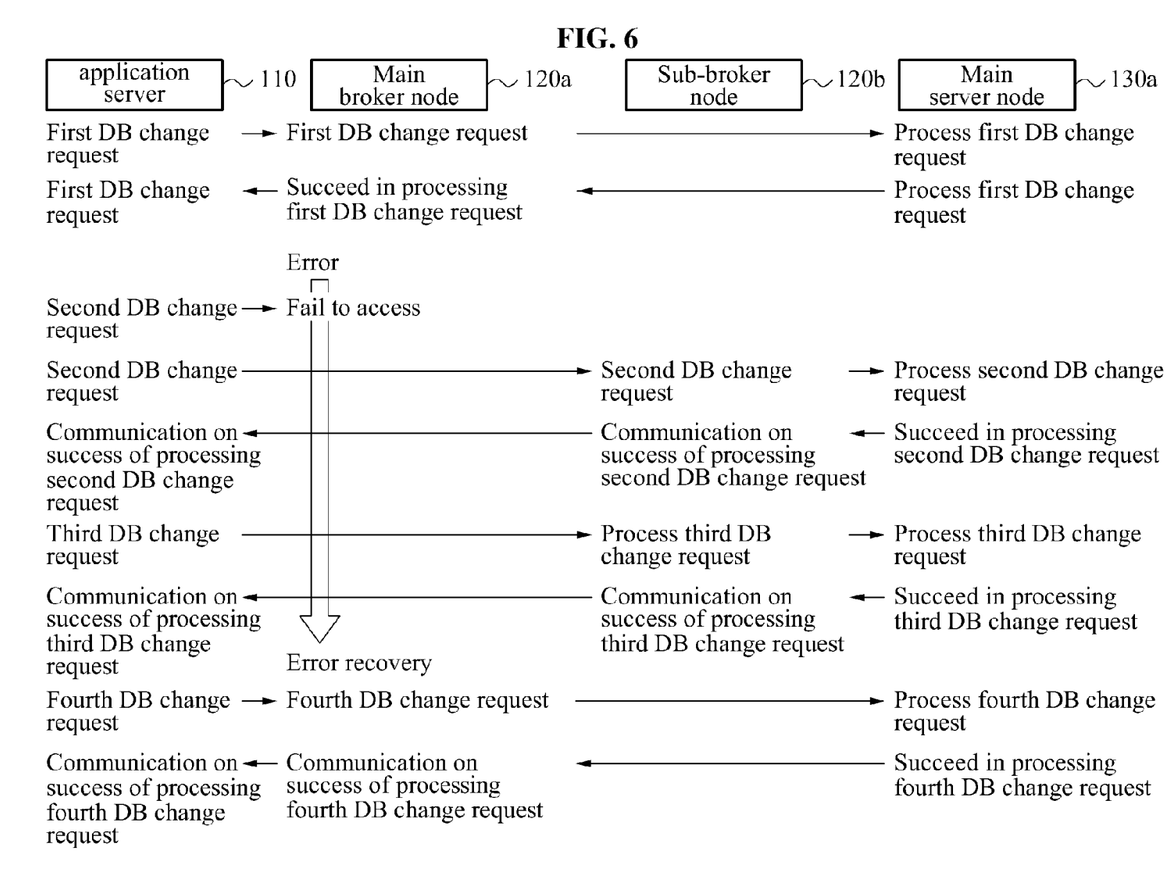
FIG. 6 is a diagram illustrating a process of fail-over and fail-back of a broker node according to an exemplary embodiment of the present invention.

Hereinafter, a process of fail-over and fail-back of a broker node when an error occurs in the broker node will be described with reference to FIG. 6.

When the main broker node 120a receives a first DB change request from the application server 110, the main broker node 120a may transmit the first DB change request to the main server node 130a, and may communicate with the application server 110 of success of a process of the first DB change request when the main broker node 120a is notified of the success of the process of the first DB change request.

Subsequently, when an error occurs in the main broker node 120a, the application server 110 may not be allowed to access the main broker node 120a and thus, may transmit a second DB change request to the sub-broker node 120b.

The sub-broker node 120b may receive the second DB change request transmitted from the application server 110, may transmit the received second DB change request to the main server node 130a, and may communicate with the application server 110 of success of a process of the second DB change request when the main server node 130a notifies the sub-broker node 120b of the success of the process of the second DB change request.

Since the main broker node 120a still has an error, the application server 110 may transmit a third DB change request to the sub-broker node 120b, and may be notified, by the sub-broker node 120b, of success of a process of the third DB change request.

When the main broker node 120a recovers from the error, the application server 110 may access the main broker node 120a and may transmit a fourth DB change request to the main broker node 120a. Accordingly, the main broker node 120a may be notified, by the main broker node 120a, of success of a process of the fourth DB change request.

Figure 7:
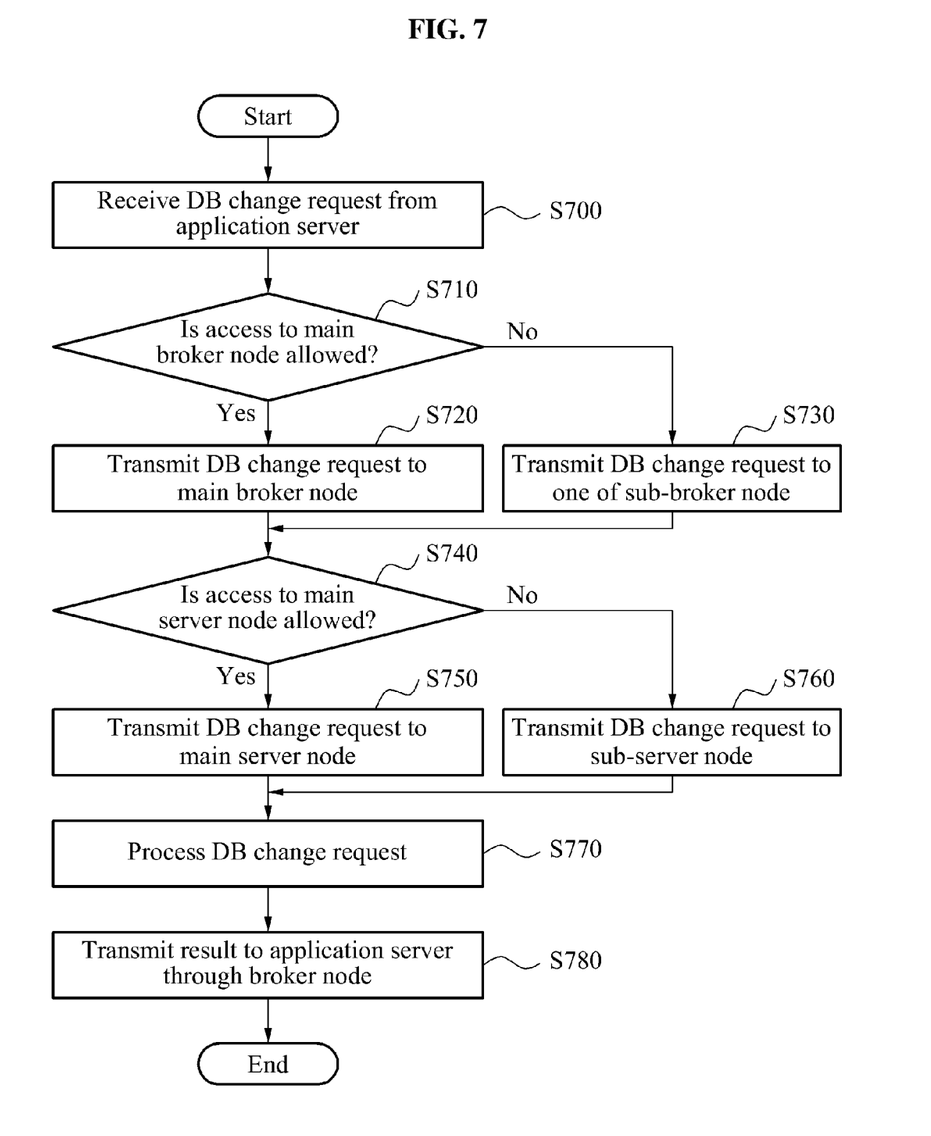
FIG. 7 is a flowchart illustrating a database (DB) management method according to an exemplary embodiment of the present invention.

Hereinafter, a method of managing a DB using a high availability DBMS will be described with reference to FIG. 7.

When a DB change request is received from an application server in operation S700, whether an access to a main broker node is allowed is determined in operation S710.

When the access to the broker node is allowed, the DB change request is transmitted to the main broker node in operation S720. When the access to the main broker node is not allowed, an access may be attempted with respect to sub-broker nodes based on a predetermined access order and the DB change request may be transmitted to a sub-broker node to which an access is allowed in operation S730.

Subsequently, whether an access by the main broker node to a main server node or to a sub-broker node is allowed may be determined in operation S740. When the access to the main server node is allowed, the DB change request may be transmitted to the main server node in operation S750. When the access to the main server node is not allowed, an access may be attempted with respect to sub-server nodes based on a predetermined server node access order and the DB change request may be transmitted to a sub-sever node to which an access is allowed in operation S760.

Subsequently, the main server node or the sub-server node that receives the DB change request may make a change in a corresponding DB by processing the DB change request in operation S770, and may transmit a result of the process to the application server via the main broker node or the sub-broker node in operation S780.

As described in the foregoing, exemplary embodiments of the present invention provide an active-active structure where all broker nodes may function as a main broker node and a backup of another broker node, and thus, the structure may cope with errors that may simultaneously occurs in the broker nodes.

Also, a plurality of server nodes is used in the exemplary embodiments of the present invention and thus, a broker node may automatically access a sub-server node although an error occurs in a main server node. Accordingly, a service may be provided continuously without correcting or changing an application server.

To provide a service continuously, replication of DB may be performed between the main server node and the sub-server node. A process of the DB replication between the main server node and the sub-server node will be described with reference to FIG. 8.

Figure 8:
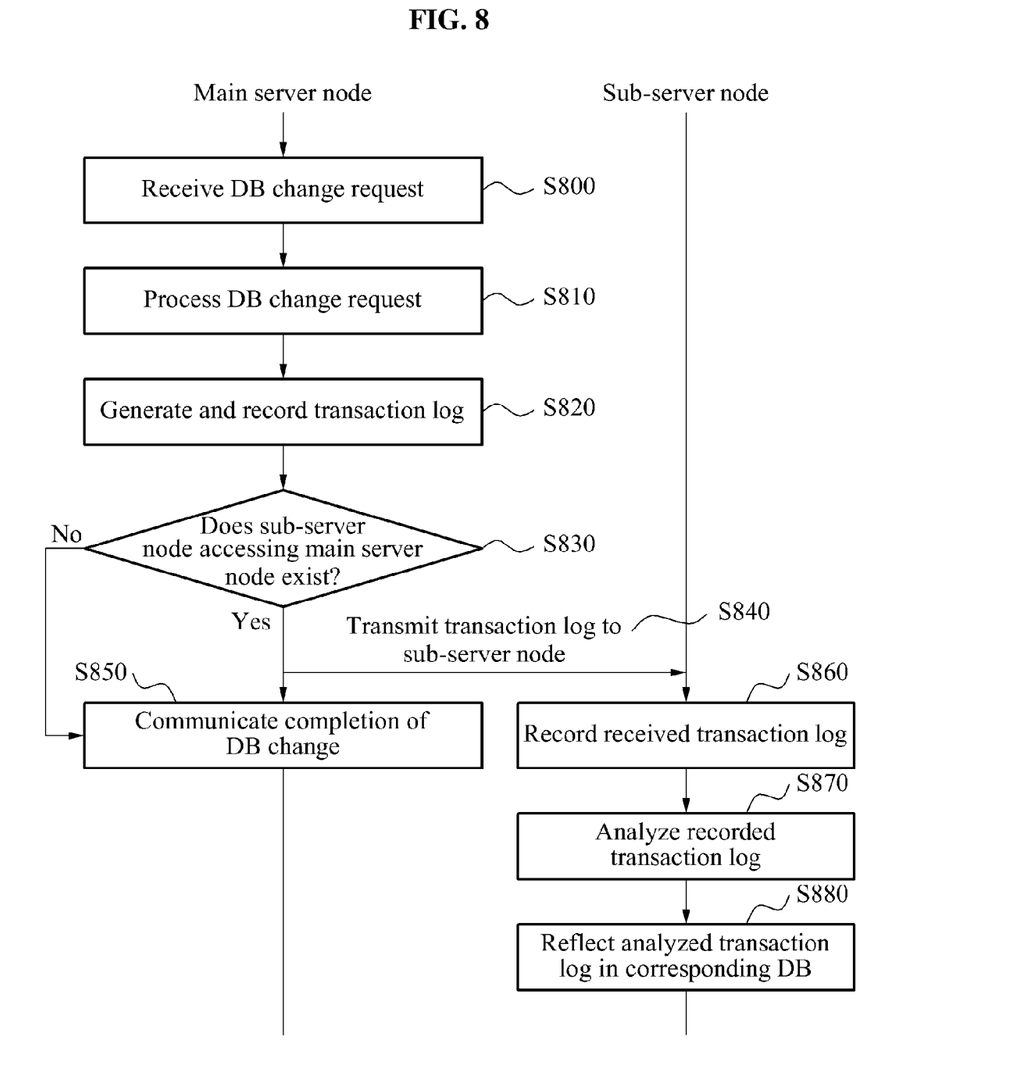
FIG. 8 is a flowchart illustrating a process of DB replication between server nodes according to an exemplary embodiment of the present invention.

The main server node receives a DB change request from a broker node in operation S800. Subsequently, the main server node may process the DB change request in operation S810, and may generate a transaction log associated with a change in a DB in operation S820.

Subsequently, the main server node may determine whether a sub-server node accessing the main server node exists in operation S830, and may transmit the generated transaction log to sub-server nodes accessing the main server node when the sub-server nodes accessing the main server node exists in operation S840.

Subsequently, the main server node may communicate with completion of the change in the DB when a termination request with respect to the change in the DB is received in operation S850.

The sub-server node that receives a transaction log of the main server node from the main server node may record the received transaction log in operation S860, and may analyze the recorded transaction log in operation S870. Subsequently, the sub-server node may reflect the analyzed transaction log in a DB of the sub-server node so as to reflect, in the DB of the sub-server node, a change in the DB of the main server node in operation S880.

The main server node and the sub-server node may perform transmission and reception of their transaction logs with each other for replication of a DB, so that the sub-server node may provide a service based on the DB of the sub-server node continuously when an error occurs in the main server node. When the main server node recovers from the error, the main server node may receive a transaction log of the sub-server node so as to reflect the transaction log in the DB of the main server node, and may provide a service based on the DB of the main server node continuously.

States that each server node goes through during a process of fail-over and fail-back happened in the main server node and the sub-server node for continuous service have been described with reference to FIG. 3, detailed description thereof will be omitted for conciseness.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Examples of computer-readable media include magnetic media such as hard disks, floppy disks, and magnetic tape; optical media such as CD ROM discs and DVD; magneto-optical media such as floptical disks; and hardware devices that are specially configured to store and perform program instructions, such as read-only memory (ROM), random access memory (RAM), flash memory, and the like. The computer-readable media may be a transmission media such as a light including a carrier wave used to transmit a signal designating a program instruction, a data structure, and the like, or a metallic line, a wave guide, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention.

Thus, it is intended that the present invention cover the modifications and variations of this invention provided they come within the scope of the appended claims and their equivalents.

What is claimed is:

1. A computer implemented method of managing a database (DB) in a high availability DB management system, the method comprising:
a plurality of broker nodes and a plurality of server nodes;
receiving a DB change request from an application server;
in response to receiving the DB change request, enabling one of the plurality of broker nodes to access a main server node from among the plurality of server nodes;
determining whether the enabled one of the plurality of broker nodes successfully accessed the main server node;
if the determining determines that the enabled one of the plurality of broker nodes successfully accessed the main server node,
   enabling the main server node to process the DB change request, and
   transmitting a result of the DB change request to the application server; and
if the determining determines that the enabled one of the plurality of broker nodes did not successfully access the main server node,
   enabling the enabled one of the plurality of broker nodes to access a sub-server node from among the plurality of sub-servers nodes according to an access order defined by an access list included in the enabled one of the plurality of broker nodes, enabling the accessed one of the plurality of sub-server nodes to process the DB change request, transmitting the result of the DB change request to the application server, setting a mode of the main server node to a standby mode, analyzing a transaction log received from the enabled sub-server node, the transaction log indicating the DB change request, reflecting the DB change request in the transaction log, and when the main server node undergoes an error recovery process, changing the mode of the main server node from the standby mode to an active mode, the active mode indicating that the enabled one of the plurality of broker nodes is enabled to access the main server node.

2. The computer implemented method of claim 1, wherein, the access order specifies that the enabled one of the plurality of broker nodes attempts to sequentially access each of the plurality of the sub-server nodes if the determining determines that the enabled one of the plurality of broker nodes did not successfully access the main server node.

3. The computer implemented method of claim 1, further comprising:

changing a mode of the accessed one of the plurality of sub-server nodes from a standby mode to an active mode, the active mode indicating that the enabled one of the plurality of broker nodes is enabled to access the accessed one of the plurality of sub-sever nodes.

4. The computer implemented method of claim 1, further comprising:

changing the mode of the accessed one of the plurality of sub-sever nodes from an active mode to a standby mode when the main server node undergoes an error recovery process, the standby mode indicating that the enabled one of the plurality of broker nodes is blocked from accessing the accessed one of the plurality of sub-sever nodes so that the broker node accesses the main server node.

5. The computer implemented method of claim 1, wherein when the main server node processes the DB change request, the method further comprises:

enabling the main server node to make a change in a DB of the main server node in response to the DB change request;

generating a transaction log associated with the change in the DB; and transmitting the transaction log to each of the plurality of sub-server nodes, each of the plurality of sub-server nodes replicating the DB of the main server node based on the transmitted transaction log.

6. The computer implemented method of claim 5, wherein each of the plurality of sub-server nodes is associated with a DB, each of the plurality of sub-server nodes are configured to reflect the transaction log of the main server node in each of the associated DBs so as to synchronize the DB of the main server node with the associated DBs of the plurality of sub-server nodes.

7. The computer implemented method of claim 1, wherein when the sub-server node processes the DB change request, the method further comprises:

enabling the accessed one of the plurality of sub-server nodes to make a change in a DB of the accessed one of the plurality of sub-server nodes in response to the DB change request;

generating a transaction log associated with the change in the DB; and transmitting the transaction log to the main server node or each of the other sub-server nodes of the plurality of sub-server nodes for replication of the DB of the accessed one of the plurality of sub-server nodes.

8. The computer implemented method of claim 7, wherein when the transaction log of the sub-server node is transmitted, the main server node or the other sub-server nodes of the plurality of sub-server nodes are configured to reflect the transaction log of the accessed one of the plurality of sub-server nodes in the DB of the main server node or DBs of the other sub-server nodes of the plurality of sub-server nodes so as to synchronize the DB of the accessed one of the plurality of sub-server nodes with the DB of the main server node or DBs of the other sub-server nodes of the plurality of sub-server nodes.

9. The computer implemented method of claim 1, further comprising:

determining whether an error has occurred in the broker node; and when the error is determined to have occurred, receiving the DB change request by a subsequent broker node from among the plurality of broker nodes based on the access order.

10. A non-transitory computer-readable medium including computer readable instructions, which when executed by a processor, configures the processor to:

receive a DB change request from an application server;

in response to receiving the DB change request, enable one of a plurality of broker nodes to access a main server node from among a plurality of server nodes;

determine whether the enabled one of the plurality of broker nodes successfully accessed the main server node;

if the determining determines that the enabled one of the plurality of broker nodes successfully accessed the main server node, enabling the main server node to process the DB change request, and transmitting a result of the DB change request to the application server; and if the determining determines that the enabled one of the plurality of broker nodes did not successfully access the main server node, enabling the enabled one of the plurality of broker nodes to access a sub-server node from among the plurality of sub-servers nodes according to an access order defined by an access list included in the enabled one of the plurality of broker nodes, enabling the accessed one of the plurality of sub-server nodes to process the DB change request, transmitting the result of the DB change request to the application server, setting a mode of the main server node to a standby mode, analyzing a transaction log received from the enabled sub-server node, the transaction log indicating the DB change request, reflecting the DB change request in the transaction log, and when the main server node undergoes an error recovery process, changing the mode of the main server node from the standby mode to an active mode, the active mode indicating that the enabled one of the plurality of broker nodes is enabled to access the main server node.

11. A database (DB) management system, the system comprising:
a processor configured to,
receive a DB change request from an application server,
determine whether an enabled one of a plurality of broker nodes successfully accessed a main server node, the main server node being among a plurality of server nodes,
transmit the DB change request to a main server node if the enabled one of the plurality of broker nodes successfully accessed the main server node, and
sequentially attempt to access at least one sub-server node from among the plurality of server nodes based on an access order if the enabled one of the plurality of broker nodes failed to access the main server node due to an error in the main server node, the access order being defined by an access list included in the enabled one of the plurality of broker nodes;
the main server node is configured to
receive and process the DB change request transmitted from the broker node when the main server node is able to be accessed by the broker node,
set a main server node mode to a standby mode, and
when the main server node undergoes an error recovery process, set the main server mode from the standby mode to an active mode, the active mode indicating that the enabled one of the plurality of broker nodes is enabled to access the main server node,
the at least one sub-server node is configured to
receive and process the DB change request transmitted from the broker node when the broker node is unable to access the main server node,
analyze a transaction log received from the main server node, the transaction log indicating the DB change request, and
reflect the DB change request in the transaction log, and
the processor is further configured to transmit a result of the DB change request to the application server.

12. The system of claim 11, wherein the plurality of broker nodes comprises a single main broker node and at least one sub-broker node.

13. The system of claim 12, wherein when the main broker node has received the DB change request from the application server and an error occurs in the main broker node, another sub-broker node is configured to receive the DB change request based on the access order.

14. The system of claim 11, wherein the main server node and the at least one sub-server node each comprises:
a server configured to,
make a change in a DB of a corresponding server node in response to the DB change request received from the broker node,
generate a transaction log associated with the change in the DB, and
transmit the transaction log to other server nodes for replication of the DB;
a log recorder configured to receive transaction logs from the remaining server nodes in an event response to a detection of an error being occurred in a corresponding server node; and
a log applier configured to reflect, to the DB of the corresponding server node through the server, the transaction logs of the other server nodes received by the log recorder in an event of an error occurring in a corresponding server node.

15. The system of claim 14, wherein the main server node and the at least one sub-server node each further comprises:
an error detector to periodically monitor whether an error or an error recovery process occurs in a corresponding server node or remaining server nodes, and to change a mode of a corresponding server node by transmitting a monitored result to the server.

16. The system of claim 15, wherein,
a mode of the sub-server node is changed from a standby mode to an active mode in response to an error being detected in the main server node, so as to enable the broker node to access the at least one sub-server node; and
the mode of the sub-server node is changed from an active mode to a standby mode in response to the error recovery process being detected in the main server node so as to block an access by the broker node to the at least one sub-server node, so that the broker node accesses the main server node.

17. The system of claim 15, wherein,
a mode of the main server node is set to a standby mode in response to the error recovery being detected;
the mode of the main server node is changed from a standby mode to an active mode in response to a transaction log being reflected to a DB of the main server node, so that the broker node accesses the main server node again.

18. The system of claim 14, the main server node and the at least one sub-server node each further comprises:
a DB to store data to provide a service; and
a transaction log storage unit to record a transaction log of a corresponding server node and transaction logs of remaining server nodes.

19. The system of claim 11, wherein at least one other sub-server node and the at least one sub-server node are included in a different Internet data center (IDC) from the main server node.

* * * * *